United States Patent [19]

Leung et al.

[11] Patent Number: 4,973,630
[45] Date of Patent: * Nov. 27, 1990

[54] COMPOSITIONS OF AROMATIC POLYBENZIMIDAZOLES AND AROMATIC POLYETHERIMIDES

[75] Inventors: Louis Leung, Hong Kong, Hong Kong; David J. Williams, Amherst, Mass.; Frank E. Karasz, Amherst, Mass.; Michael Jaffe, Amherst, Mass.; William J. MacKnight, Maplewood, N.J.

[73] Assignee: Hoechst Celanese Corp., Somerville, N.J.

[*] Notice: The portion of the term of this patent subsequent to Nov. 27, 2007 has been disclaimed.

[21] Appl. No.: 831,385

[22] Filed: Feb. 19, 1986

[51] Int. Cl.$^5$ .................... C08L 79/06; C08L 79/08
[52] U.S. Cl. ................................ 525/432; 525/435; 525/931
[58] Field of Search ................ 525/432, 435, 931

[56] References Cited

FOREIGN PATENT DOCUMENTS 1226711 3/1971 United Kingdom .
1237004 6/1971 United Kingdom .

OTHER PUBLICATIONS

Plast. Massy 1973 (4) 15–17, Chudina et al., "Polyimides and Polybenzimidazoles for Glass–Fiber Reinforced Plastics and Adhesives" (English Translation and Abstract).
Report 1985, U. Mass Dep. Poly. Sci. Eng., Order No. AD-A166150/3/Gar-Improved Structural Polymor Alloys and Composites.

Primary Examiner—Ana L. Carrillo
Attorney, Agent, or Firm—Kenneth E. MacKlin

[57] ABSTRACT

Miscible compositions comprising from about 1 part by weight to about 99 parts by weight of an aromatic polyetherimide and from about 99 parts by weight of about 1 part by weight of an aromatic polybenzimidazole. Preferably, the composition comprises from about 5 parts by weight to about 95 parts by weight of an aromatic polyetherimide and from about 95 parts by weight to about 5 parts by weight of an aromatic polybenzimidazole. In a composition mostly comprised of an aromatic polybenzimidazole, it is preferred that the aromatic polyetherimide be present in the composition in an amount sufficient to make the aromatic polybenzimidazole more thermally processable and also less susceptible to moisture. More preferably, such compositions are comprised of from about 65 parts by weight to about 95 parts by weight of an aromatic polybenzimidazole and from about 35 parts by weight to about 5 parts by weight of an aromatic polyetherimide. In a composition mostly comprised of an aromatic polyetherimide, it is preferred that the aromatic polybenzimidazole be present in an amount sufficient to render the aromatic polyetherimide less sensitive to solvents, and to increase the glass transition temperature of the polyetherimide. More preferably, such compositions are comprised of from about 65 parts by weight to about 95 parts by weight of an aromatic polyetherimide and from about 35 parts by weight to about 5 parts by weight of an aromatic polybenzimidazole.

22 Claims, 5 Drawing Sheets

COMPOSITIONS OF AROMATIC POLYBENZIMIDAZOLES AND AROMATIC POLYETHERIMIDES

This invention was made with Government support under Contract No. F49620-84-C-0051 awarded by the Department of Defense (DOD). The Government has certain rights in this invention.

This invention is concerned with a novel composition comprising an aromatic polyetherimide and an aromatic polybenzimidazole. The novel compositions are suitable for the formation of coatings, films, thermoplastic molding compositions, and the like.

BACKGROUND OF THE INVENTION

The number of known classes of high performance polymers which are useful under severe environmental conditions is limited. In addition, some of the known classes of polymers are deficient in some properties, e.g., impact resistance, solvent resistance, and processability. Some are also quite expensive.

PRIOR ART

The aromatic polyetherimides (PEI) are a series of engineering thermoplastics. One class of polyetherimides is available from General Electric under the tradename of Ultem ®. For relatively inexpensive polymers, they have high heat resistance, high strength-to-weight ratio, high modulus, excellent non-flammability characteristics, processability on conventional molding equipment, low smoke evolution, high dielectric strength, and stable dielectric constant and dissipation factor over a wide range of temperatures and frequencies. They have generally good resistance to chemicals with the exception of chlorinated solvents, ethylene glycol antifreeze, brake fluid, and N,N-dimethylformamide, among others. [Product Guide to Ultem ® and Material Safety Data, General Electric (1983)]. However, the utility of the aromatic polyetherimides is severely limited in the aerospace industry, where resistance to paint strippers such as methylene chloride is required.

Aromatic polybenzimidazoles are characterized by a high degree of thermal stability. They may be shaped to form fibers, films, and other articles of wide utility which show resistance to degradation by heat, hydrolytic media and oxidizing media. However, many of the polybenzimidazoles are not easily thermally processable at desirably low enough temperatures and pressures.

Aromatic polybenzimidazole (PBI) available from Celanese Corporation has the following formula:

The PBI too has high heat and chemical resistance, and dielectric strength. Unfortunately, the aromatic polybenzimidazoles have relatively high moisture regain, which although desirable for textile fibers, is undesirable for engineering plastics. In addition, they are rather expensive polymers.

The procedures to synthesize aromatic polyetherimides were fully described by White et al.. [D. M. White et al., J. Polymer Sci.—Chem 19, 1635 (1981)]. The reaction [T. Takekoshi et al., ACS preprint, 20(1), Honolulu 1979; D. M. White, U.S. Pat. Nos. 4,324,883; 4,324,884; 4,324,885; 4330,666 (1982)] involves a two-step displacement polymerization: (1) cyclization and (2) displacement [T. Takekoshi et al., ACS preprint, 20(1), Honolulu (1979)]. Either one of the two steps can proceed before the other. For example, a diamine may be first reacted (cyclization) with 3- or 4-nitrophthalic anhydride (the 3-position is more reactive than the 4-position) to form disubstituted bisnitroimide, which is subsequently subjected to nitrodisplacement polymerization with alkali metal salts of various bisphenols. Several methods can be used to generate the dianion. For example, the dianion of bisphenol may be prepared by adding sodium hydroxide or sodium methoxide to bisphenol A under anhydrous conditions. The polymerization step generally proceeds rapidly under relatively mild conditions in dipolar aprotic solvents or in a mixture with toluene to form high molecular weight products. By varying the nature of the diamine and the position of substitution in the bis-imides and using different bisphenols, a la-ge number of aromatic polyetherimides with a wide range of physical properties can be prepared [D. M. White et al., J. Polymer Sci.—Chem 19, 1635 (1981)].

Processes for the preparation of aromatic polybenzimidazoles are described in a number of U.S. Pat. Nos., e.g., 3,901,855; 4,002,679; 3,433,772; 3,441,640; 3,509,108; 3,526,693; 3,549,603; 3,552,389; 3,619,453; 3,671,491; 3,969,430; and 4,020,142. In addition, a review of the processes for the preparation of aromatic polybenzimidazoles is contained in J. P. Critchley, G. J. Knight and W. W. Wright, *Heat-Resistant Polymers—Technologically Useful Materials*, Plenum Press, New York (1983), 259-322. This reference makes the point that despite considerable research effort, polybenzimidazoles have not been commercially successful except as fibers and fabrics. On page 259, it states that polybenzimidazoles "have not been very substantial competitors" to the polyimides.

Unduly broad but unenabling suggestions about blending polymers exist in the literature, e.g., U.S. Pat. No. 4,302,413 and "Product Guide to Ultem ® and Material Safety Data", General Electric (1983), which states that the Ultem ® polyetherimides "may be . . . compounded with other polymers to produce unique resin blends and alloys." However, most pairs of polymers tend to be totally immiscible [Fred W. Billmeyer, Jr., *Textbook of Polymer Science*, Wiley-Interscience, New York (1984), 176]. It is also known that even many polyimides are not miscible with each other. It is therefore surprising that the compositions of the present invention are miscible and also surprising that there are synergistic ameliorative effects of one polymer on the other's weak properties, as detailed below.

U.S.S.R. Inventor's Certificate SU No. 1016321 A, entitled "Procedure for the production of Film Materials Based on Aromatic Polybenzimidazole" describes dissolving a polybenzimidazole in N,N-dimethylformamide and then dissolving a poly-bis-maleimide in the solution, and pouring the solution onto a glass plate. After 3-4 hours the film is removed from the plate and heated at 180° C. The poly-bis-maleimide is an oligomer of rather low molecular weight, which is addition polymerized to produce a crosslinked structure of essentially infinite molecular weight after it is blended with the polybenzimidazole. In contrast, the aromatic polyetherimides used in the compositions of the present invention are high molecular weight linear condensation polymers. Furthermore, the imide ring in the bis-maleimide is linked to an aliphatic group, whereas the imide ring in the present invention forms a fused ring structure with an aromatic moiety. The composition of the U.S.S.R. Inventor's Certificate is apparently crosslinked to form a thermoset resin, whereas the preferred compositions of the present invention are essentially linear thermoplastic resins.

Japanese Patent Publication No. 17468 (1973), entitled "Polybenzimidazole Molding Material," describes mixing a polybenzimidazole and a nylon, e.g., nylon 6 or nylon 66 in a solvent such as N,N-dimethylformamide or N,N-dimethylacetamide, kneading the mixture, dropping the kneaded mixture into water, and then heating the mixture at 200° C. under vacuum to remove water and N,N-dimethylacetamide. The resulting material was ground to obtain molding material of 15 mesh particle size. It is apparent from the reference that a miscible blend is not formed but rather a non-miscible dough-like mass, which must be kneaded to effect the physical admixture.

SUMMARY OF THE INVENTION

Despite the fact that most pairs of polymers tend to be immiscible, we have discovered unexpectedly that aromatic polyetherimides and aromatic polybenzimidazoles are miscible in all proportions.

Briefly, the invention comprises a novel composition comprising from about 1 part by weight to about 99 parts by weight of an aromatic polyetherimide and from about 99 parts by weight to about 1 part by weight of an aromatic polybenzimidazole. Preferably, the composition comprises from about 5 parts by weight to about 95 parts by weight of an aromatic polyetherimide and from about 95 parts by weight to about 5 parts by weight of an aromatic polybenzimidazole. Most preferably, the composition comprises at least about 10 to 30 parts by weight of an aromatic polybenzimidazole or an aromatic polyetherimide.

The miscible compositions of the invention may be prepared by a process which comprises dissolving an aromatic polybenzimidazole and an aromatic polyetherimide in a mutual solvent in relative weight proportions to each other of from about 1 to about 99 of the aromatic polybenzimidazole to about 99 to about 1 of the aromatic polyetherimide and then adding the solution to a non-solvent for the composition to precipitate the novel composition and subsequently drying the composition.

The novel compositions of this invention have unexpected properties and benefits. The compositions are useful under severe environmental conditions. The compositions have good impact resistance, solvent resistance, and good price/performance characteristics. Although aromatic polybenzimidazoles generally have high glass transition temperatures and good solvent resistance, they are expensive polymers with high moisture regain. Aromatic polyetherimides generally have relatively low glass transition temperatures and lack resistance to certain solvents, but they are tractable polymers and are much less expensive than aromatic polybenzimidazoles.

Therefore, it is an object of this invention to provide compositions of aromatic polybenzimidazoles and aromatic polyetherimides, which are less expensive than aromatic polybenzimidazoles and which have higher glass transition temperatures and better solvent resistance than aromatic polyetherimides with better price/performance characteristics.

It is a further object of this invention to provide compositions of aromatic polybenzimidazoles which are useful in molding processes and in applications where the polybenzimidazoles themselves were either not useful or not as useful.

DESCRIPTION OF THE PREFERRED EMBODIMENTS

Although other classes of aromatic polyetherimides may be used in the compositions of this invention, preferred aromatic polyetherimides which may be used in the compositions and processes of this invention have repeating units of the following formula wherein >Ar$^1$— and >Ar$^3$— represent trivalent aromatic moieties or mixtures thereof; wherein Y represents divalent aromatic moieties —Ar$^2$—, or divalent aliphatic moieties R$^1$ containing up to 6 carbon atoms, or mixtures thereof; wherein Z represents aromatic moieties —Ar$^4$—, or divalent aliphatic moieties R$^2$ containing up to 6 carbon atoms, or mixtures thereof; and wherein x is the number of repeating units and may have a value of 0 or a positive integer.

Figure 1:
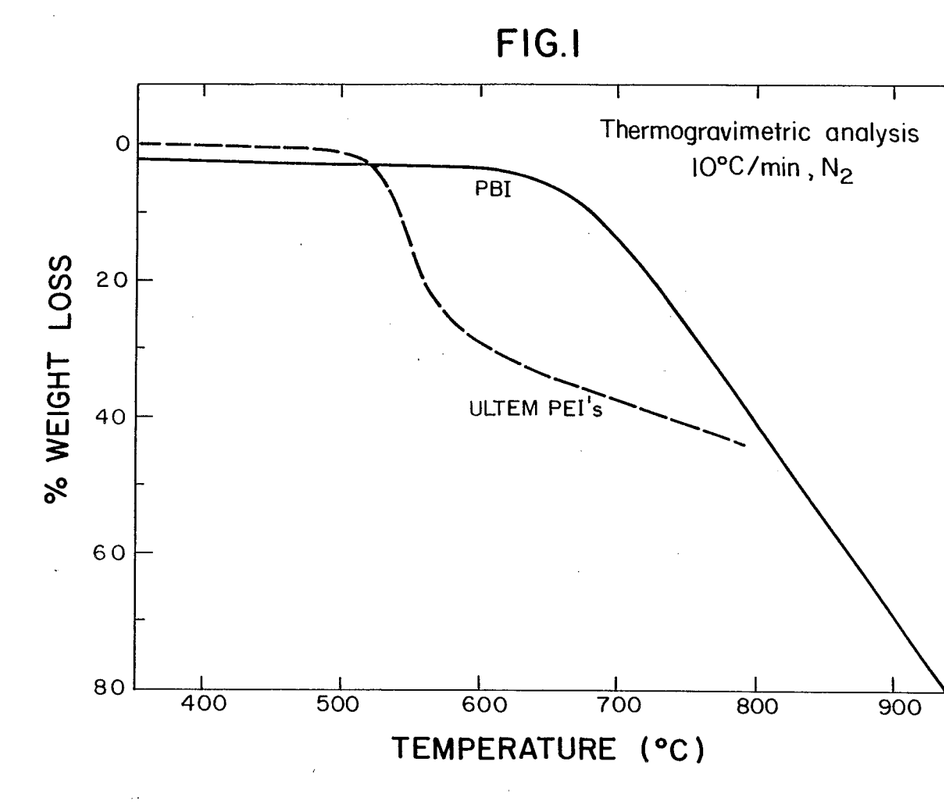
FIG. 1 shows the thermal stability of aromatic polybenzimidazole relative to the thermal stabilities of Ultem ® 1000, D5000, and 6000 aromatic polyetherimides. The thermal stabilities of those three members of the family of Ultem ® polyetherimides are essentially equivalent, as shown in Table 3.

The Ultem ® polyetherimides from General Electric are most preferred. Their different grades of aromatic polyetherimides, e.g., Ultem ® 1000, D5000 and 6000, may be blended in different compositions as described below. Ultem ® 1000 is an amorphous homopolymer with a weight average molecular weight of about 30,000±10,000. It has the following formula:

Ultem ® 6000 and D5000 are copolymers. Elemental analysis data for these polymers are given in Table 1. The glass transition temperatures, as determined by Differential Scanning Calorimetry, are shown in Table 2 as 217°, 223° and 233° C. for Ultem ® 1000, D5000 and 6000, respectively. As shown in Table 3, their thermal stabilities are equivalent to each other, and their stabilities relative to aromatic polybenzimidazole are shown in FIG. 1.

The aromatic polyetherimides are only soluble in a few selected solvents. Both the Ultem ® 1000 and 6000 dissolved readily in methylene chloride, chloroform, N,N-dimethylformamide and N,N-dimethylacetamide. Heating was required for Ultem ® 6000 in order to obtain a clear solution. The D5000, ostensibly designed to be solvent resistant, was soluble in hot chloroform. The utility of the aromatic polyetherimides is severely limited in the aerospace industry, where resistance to paint strippers such as methylene chloride is required.

Although any aromatic polybenzimidazole described in the prior art may be used, the preferred aromatic polybenzimidazoles employed as starting materials to prepare the novel compositions of the present invention are those having the repeating unit formula:

wherein >Ar⁵< represents a tetravalent aromatic moiety having the formula wherein $R^3$ is —O—, —SO$_2$—, or —(CH2)x and x is a positive integer; and —Ar⁶— represents a divalent aromatic moiety having the formula wherein $R^4$ is —O—, —(CH2)x, or —Si(CH$_3$)$_2$—O—Si(CH$_3$)$_2$— and x is a positive value.

Examples of the more preferred aromatic polybenzimidazoles which may be used in the compositions of the present invention include:
poly-2,2'-(m-phenylene)-5,5'-bibenzimidazole;
poly-2,2'-(pyridylene-3",5")-5,5'-bibenzimidazole;
poly-2,2'-(furylene-2",5")-5,5'-bibenzimidazole;
poly-2,2'-(naphthalene-1",6")-5,5'-bibenzimidazole;
poly-2,2'-(biphenylene 4",4")-5,5'-bibenzimidazole;
poly-2,6'-(m-phenylene)-diimidazobenzene;
poly-2,2'-(m-phenylene)-5,5'-di(benzimidazole)ether;
poly-2,2'-(m-phenylene)-5,5'-di(benzimidazole)sulfide;
poly-2,2'-(m-phenylene)-5,5'-di(benzimidazole)sulfone,
poly-2,2'-(m-phenylene)-5,5'-di(benzimidazole)methane;
poly-2,2'-(m-phenylene)-5,5"di(benzimidazole)-propane-2,2; and
poly-2,2"-(m-phenylene)-5,5"di(benzimidazole)-ethylene-1,2 where the double bonds of the ethylene groups are intact in the final polymer.

Poly-2,2'-(m-phenylene)-5,5'-bibenzimidazole, which contains recurring units of the formula:

is most preferred. Aromatic polybenzimidazoles of this type are commercially available from Celanese Corporation. These polybenzimidazoles are preferred components of the compositions because they are relatively more thermally stable and more soluble in N,N-dimethylacetamide than other polybenzimidazoles. This desirable combination of thermal stability and solubility makes them relatively processable. In addition, they have higher molecular weights than other polybenzimidazoles.

The novel compositions comprise from about 1 part by weight to about 99 parts by weight of an aromatic polyetherimide and from about 99 parts by weight to about 1 part by weight of an aromatic polybenzimidazole. Preferably, the compositions are comprised of from about 5 parts by weight to about 95 parts by weight of an aromatic polyetherimide and from about 95 parts by weight to about 5 parts by weight of an aromatic polybenzimidazole. The more preferred compositions are those which are comprised mostly of either the aromatic polybenzimidazole or the aromatic polyetherimide.

If a composition of the invention is mostly comprised of aromatic polybenzimidazole, it is preferred that the minor amount of aromatic polyetherimide in the composition be sufficient to make the aromatic polybenzimidazole more tractable and processable for molding purposes and also less susceptible to moisture. It is thought that the minor amount of the aromatic polyetherimide accomplishes the amelioration of the processability of the aromatic polybenzimidazole by plasticizing the aromatic polybenzimidazole. More preferably, the compositions are comprised of from about 65 parts by weight to about 95 parts by weight of an aromatic polybenzimidazole and from about 35 parts by weight to about 5 parts by weight of an aromatic polyetherimide. Most preferably, the composition comprises at least about 10 parts by weight of an aromatic polyetherimide. It is surprising that a minor amount of the polyetherimide can ameliorate the weak properties of the polybenzimidazole, i.e., poor thermal plasticity and moisture regain, while resulting in a composition with a glass transition temperature not substantially below the glass transition temperature of the polybenzimidazole itself. At the same time the less expensive polyetherimide decreases the cost of the composition substantially below the cost of the polybenzimidazole.

If a composition of the invention is mostly comprised of aromatic polyetherimide, it is preferred that the minor amount of aromatic polybenzimidazole in the composition be sufficient to render the aromatic polyetherimide less sensitive to solvents, particularly chlorinated hydrocarbons. Preferably, the aromatic polybenzimidazole is present in an amount sufficient to result in a composition with greatly reduced solubility and low swelling, i.e., minimal weight loss in the composition of the invention when it is immersed in a chlorinated hydrocarbon for a period of time which would ordinarily result in the dissolving of a similar object molded from the aromatic polyetherimide itself. More preferably, the compositions are comprised of from about 65 parts by weight to about 95 parts by weight of an aromatic polyetherimide and from about 35 parts by weight to about 5 parts by weight of an aromatic polybenzimidazole. Most preferably, based on preliminary tests, the composition should contain at least about 25 to 30 parts by weight of a polybenzimidazole in order to impart to the aromatic polyetherimide component greatly enhanced solvent-resistance in chlorinated solvents. In addition to improving solvent resistance, greater amounts of aromatic polybenzimidazole in the composition substantially increase the glass transition temperature of the composition, giving excellent price-performance results. At the current time, aromatic polybenzimidazoles are on the order of eight times the price of aromatic polyetherimides. Aromatic polyetherimides are commercially successful because of their generally good combination of properties, with the exception, of course, of poor resistance to solvents. Those properties can be substantially improved in accordance with this invention by incorporating a minor amount of a relatively more expensive aromatic polybenzimidazole in a miscible blend with the aromatic polyetherimide. It appears that all the beneficial properties of the aromatic polyetherimides may be retained and solvent resistance and glass transition temperature improved at a moderate additional cost. It is surprising that a minor amount of the polybenzimidazole can ameliorate the weak properties of the polyetherimide, i.e., poor resistance to solvents and relatively low glass transition temperature, without decreasing the processability of the polyetherimide itself. At the same time, the less expensive polyetherimide decreases the cost of the composition substantially below the cost of the polybenzimidazole.

In order to prepare miscible compositions of the invention from, e.g., Ultem ® 1000 aromatic polyetherimide and the Celanese aromatic polybenzimidazole at different weight compositions, the aromatic polybenzimidazoles and aromatic polyetherimides may be first dissolved in a mutual solvent, e.g., N,N-dimethylformamide, N,N-dimethylacetamide or N-methylpyrrolidone, so that each polymer is present in the resulting solution at the desired concentration up to the total polymer concentration of, e.g., from about 1% to about 30% on a weight/volume basis, preferably from about 1% to 15% each. It is preferred that the total concentration of the two polymers in the solution be such that the viscosity of the solution is acceptable for subsequent processing. The two polymers may be simultaneously dissolved in the solvent, or each polymer may be separately dissolved in separate volumes of solvent and desired portions of the resulting solutions can be mixed together to form a solution of the two polymers.

At low concentrations of polybenzimidazoles, it is not necessary to add lithium chloride to the solution. However, at higher concentrations, it may be desirable to add lithium chloride to improve the stability of the polybenzimidazole in the solution, as it might otherwise separate from the solution. It is preferable to avoid adding anything other than the constituent polymers to the solution in order to avoid the problem of removing it from the composition after the solvent is removed.

Then the solution may be added to a non-solvent for the composition, e.g., methanol, to precipitate a novel composition of this invention in the desired concentration of component polymers. Subsequently, the precipitated composition is washed with, e.g., methanol or water, to remove residual solvent and lithium chloride if it is present and then, e.g., vacuum-dried at moderate temperatures. If films of the solution of the composition are cast, the solvent should be evaporated at low relative humidity, e.g. in a dry nitrogen atmosphere, and moderate temperatures, e.g., at about 100° C. After a substantial portion of the solvent is removed (e.g., about 85%), the remaining solvent and any lithium chloride may be removed by washing the film with hot water. Whether the solution of the composition is cast or precipitated, moisture should be initially excluded until most of the solvent is removed. Also, the composition should not be heated above its glass transition temperature or phase separation may result.

Figure 2:
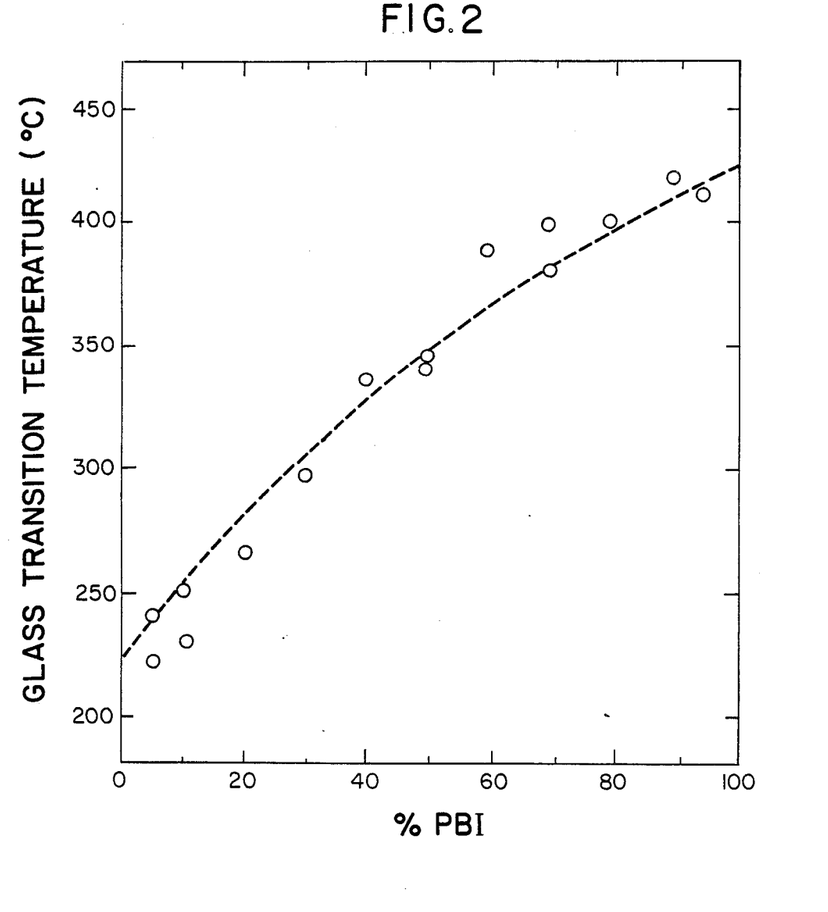
FIG. 2 was constructed from single glass transition values obtained during the single differential scanning calorimetry scans which were run on compositions ranging from about 5% to 95% Ultem ® 1000 polyetherimide.

The generally accepted criteria for blend miscibility is a single glass transition which is intermediate to the glass transitions of the blend components. As a first approximation, the intermediate glass transition of the miscible blend will be close to that predicted by a linear interpolation between the glass transitions of the blend components. Non-miscible physical mixtures or phase-separated blends will display two glass transitions, one corresponding to the composition of each phase. In the case of complete phase separation or total incompatibility, the two transitions will correspond to those of the blend or mixture components. FIG. 2 shows the single intermediate glass transitions determined from single differential scanning calorimetry scans for Celanese polybenzimidazole-Ultem ® 1000 compositions ranging from 5% to 95% Ultem ® 1000. Thus, polybenzimidazole and Ultem ® 1000 are apparently miscible in all proportions. For this system, the glass transitions are slightly higher than those predicted by linear interpolation between the glass transitions of the component polymers.

Figure 3:
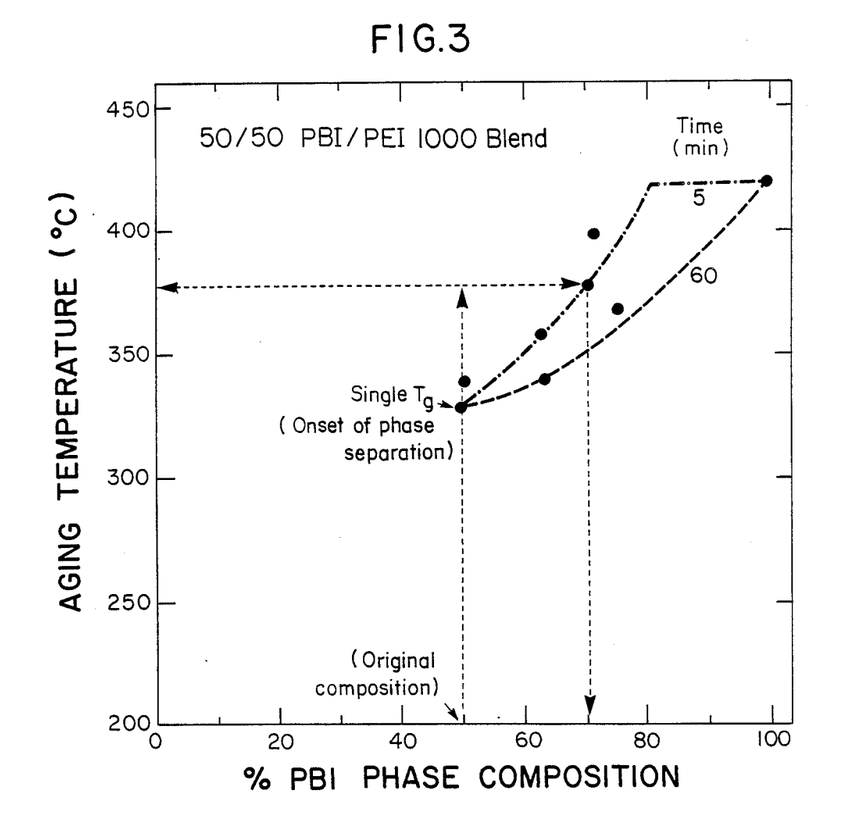
FIG. 3 presents data from a phase separation study of a 50/50 miscible blend conducted in the Differential Scanning Calorimeter (DSC) under nitrogen and at ambient pressure.

FIG. 3 presents data from a phase separation study of a 50/50 miscible blend conducted in the Differential Scanning Calorimeter under nitrogen and at ambient pressure. The blend was thermally aged above the glass transition at the temperatures indicated in the Figure for 5 and 60 minutes. After aging, the blends were quench-cooled and a second scan was run at a heating rate of 25° C./min. Phase separation was evidenced by the appearance of two glass transitions during this second scan. The lower glass transition corresponded to that of Ultem ® 1000. The higher glass transition was between that of the unannealed miscible blend and the polybenzimidazole. The composition of the higher glass transition phase was determined from FIG. 2, and this composition was used to construct FIG. 3.

Thus, although the compositions of the invention are miscible in all proportions and are useful as such, useful phase-separated systems may be formed by heating the compositions above their glass transition temperature and then rapidly quench-cooling them below that temperature to freeze the phase-separated morphology in place. The composition and properties of phase-separated systems can be controlled and varied according to the specific properties required, using pressure, temperature, time at the phase-separation conditions, and initial composition as variables. Obviously, innumerable combinations of these parameters can be employed to produce a wide assortment of potentially useful phase-separated systems.

Phase-separated systems have property synergisms when used at a temperature above the glass transition temperature of the aromatic polyetherimide component of the composition. It is possible to obtain phase-separated compositions where the matrix polymer is either the aromatic polybenzimidazole or the aromatic polyetherimide and the dispersed phase is the other polymer. This depends on which polymer is the preponderant component and the technique employed to cause the phase separation. If the aromatic polybenzimidazole is the matrix polymer of the phase-separated composition, the aromatic polyetherimide is the dispersed phase and the composition is used above the glass transition of the aromatic polyetherimide, then the composition is an impact-resistant plastic. If, however, the aromatic polyetherimide is the matrix polymer of the phase-separated composition, the aromatic polybenzimidazole is the dispersed phase and the composition is used above the glass transition of the aromatic polyetherimide, then the composition is a reinforced rubber.

Novel compositions according to the present invention may also possess further utility in that they may cause the polymer mixture to undergo crosslinking if heated at a suitable temperature, thereby improving certain properties of the constituent polymers such as softening point and resistance to solvents under stress. Such a crosslinking technique could be applied to produce resins useful in fabricating articles which have excellent mechanical and electrical properties coupled with outstanding thermal and combustion characteristics and are particularly advantageous when used as insulation for electrical conductors because they exhibit high resistance to attack by solvents and to heat stress embrittlement.

The following examples describe the manner and process of making and using the invention and set forth the best mode contemplated by the inventors for carrying out the invention, but are not to be construed as limiting.

The invention is additionally illustrated in the following examples wherein the preferred aromatic polybenzimidazole polymer is used, namely, poly-2,2'-(m-phenylene)-5,5'-bibenzimidazole.

EXAMPLE 1

Three different grades of Ultem ® (1000, D5000 and 6000) were obtained from General Electric and blended in different compositions as described below. Ultem ® 1000 is an amorphous homopolymer, whereas Ultem ® D5000 and Ultem ® 6000 are both copolymers. Elemental analysis of the Ultem ® samples is shown in Table 1.

TABLE 1

| | | Elemental Analysis | | | | | |
| | | "As Received" | | | Reprecipitated[b] | | |
| Element | Theoretical[a] | Ultem ® 1000 | Ultem ® D5000 | Ultem ® 6000 | Ultem ® 1000 | Ultem ® D5000 | Ultem ® 6000 |
| --- | --- | --- | --- | --- | --- | --- | --- |
| C | 75.0 | 74.99 | 74.94 | 74.11 | 74.78 | 74.51 | 73.83 |
| H | 4.1 | 4.07 | 4.09 | 3.91 | 3.96 | 4.29 | 3.7 |
| N | 4.7 | 4.77 | 4.72 | 5.24 | 4.74 | 4.79 | 5.19 |
| O[c] | 16.2 | 16.17 | 16.25 | 16.74 | 16.52 | 16.41 | 17.25 |
| S | | | | | <0.05 | <0.05 | <0.05 |

[a]For Ultem ® 1000. [Product Guide to Ultem ® and Material Safety Data, General Electric (1983)].
[b]Dissolved in methylene chloride (1000 or 6000) or chloroform (5000) and reprecipitated with methanol
[c]Subtract weight percent of C, H, N from 100%

Differential Scanning Calorimetry experiments were conducted in a Perkin-Elmer DSC7 microcalorimetry controlled by a Perkin-Elmer 7500 PC. The samples were continuously flushed with nitrogen. Glass transition temperatures were measured with a heating rate of 10° C./min. The glass transition temperatures, as shown in Table 2, are 217°, 223° and 233° C. for Ultem ® 1000, D5000 and 6000, respectively. The "as received" polymers have a higher glass transition temperature than the reprecipitated ones.

TABLE 2

Glass Transition Temperatures of Ultem ® Resins
by Differential Scanning Calorimetry at 10°/min.

| Sample | "As Received"[a] Onset (°C.) | $T_g$ (°C.) | Reppt.[b] Onset | $T_g$ | Reference[c] |
|---|---|---|---|---|---|
| Ultem ® 1000 | 217 | 221 | 212 | 217 | 217 |
| Ultem ® D5000 | 221 | 225 | 217 | 222 | 223 |
| Ultem ® 6000 | 232 | 237 | 229 | 233 | — |

[a]Pellet form
[b]Dissolved in methylene chloride (1000 & 6000) or chloroform (5000) and reprecipitated with methanol
[c]Product Guide to Ultem ® and Material Safety Data, General Electric (1983)

Weight loss curves were obtained on a Perkin-Elmer TGS2 Thermobalance while heating at a rate of 10° C./min. under nitrogen. Results are shown in Table 3. The chemical stabilities of the Ultem ® samples are equivalent to each other, and their stabilities relative to aromatic polybenzimidazole are shown in FIG. 1.

TABLE 3

Thermal Gravimetric Analysis
In $N_2$, 10° C./min

| Sample % Wt. Loss @ Temp. (°C.) | Ultem ® 1000 | Ultem ® D5000 | Ultem ® 6000 |
|---|---|---|---|
| Onset | 527 | 525 | 525 |
| 5% | 530 | 528 | 530 |
| 10% | 542 | 540 | 540 |
| 15% | 550 | 548 | 550 |
| 20% | 558 | 556 | 558 |

The aromatic polyetherimides are only soluble in a few selected solvents. Both the Ultem ® 1000 and 6000 dissolved readily in methylene chloride, chloroform and N,N-dimethylformamide (heating was required for Ultem ® 6000 in order to obtain a clear solution). The D5000, ostensibly solvent resistant, was soluble in hot chloroform.

Blends

Ultem ® 1000 was blended with the Celanese aromatic polybenzimidazole at different weight compositions. The blends of aromatic polybenzimidazoles and aromatic polyetherimides were prepared by first dissolving the aromatic polybenzimidazole and aromatic polyetherimide in N,N-dimethylformamide so that each polymer was present in the resulting solution at the desired concentrations, e.g., 1% each on a weight-/volume basis, and then adding the solution to methanol to precipitate a novel composition of this invention in the desired concentration. These compositions were then washed with additional methanol and dried under mild thermal conditions, e.g., 50° C. or less.

TABLE 4

Miscibility Studies

| Wt. Composition PEI/PBI | Lower | Tg (°C.) Intermediate | Upper | Solvent/ Non-Solvent | Comments |
|---|---|---|---|---|---|
| 95/5 | | 218 | | DMF/MeOH | |
| 90/10 | | 225 | | | 1st scan, quench |
| 90/10 | 217 | | Not observed | DMF/MeOH | 2nd scan |
| 50/50 | | 343 | | | 1st scan, quench |
| 50/50 | 208–212 | | 427 | DMF/MeOH | 2nd scan |

Table 4 shows glass transition data for various blends of Ultem ® 1000 and Celanese polybenzimidazole which had been subjected to two DSC scans. The first scan was conducted on a freshly prepared sample from room temperature to about 450° C. As can be seen, a single intermediate glass transition was observed for each sample during this first scan, indicating blend miscibility. Two of the samples were cooled to 50° C. and a second scan was run. In the case of the 50/50 blend, two glass transitions, corresponding respectively to the Ultem ® 1000 and polybenzimidazole components, were observed, indicating that phase separation had occurred upon heating the blend above its glass transition. In the case of the 90/10 blend, a single glass transition corresponding to Ultem ® 1000 was observed. The glass transition for PBI could not be observed probably because so little of it was present and its mass was overwhelmed by that of the Ultem ® 1000.

Single DSC scans were run on compositions ranging from about 5% to 95% Ultem ® 1000, using the sample preparation methods described in the preceding paragraph. The single glass transition values obtained during this single scan were used to construct FIG. 2.

Table 5 presents DSC data for 50/50 blends of Ultem ® D5000 and Ultem ® 6000 with polybenzimidazole. The experiments were conducted under the same conditions used to compile the data in Table 4. In each case, a single intermediate glass transition was obtained during the first scan and two glass transitions were obtained during the second scan, one close to the values for each component polymers. Thus, Ultem ® D5000 and Ultem ® 6000 display similar behavior to Ultem ® 1000 in blends with polybenzimidazole.

TABLE 5

Miscibility Studies of 50/50 Blends

| 50/50 Blends* | | ←Tg (°C.)→ | |
|---|---|---|---|
| | | Low | Intermediate | High |
| PBI/D5000 | 1st Scan | | 341 | |
| Tg = 222° C. | 2nd Scan | 214 | | 414 |
| PBI/6000 | 1st Scan | | 339 | |
| Tg = 233° C. | 2nd Scan | 225 | | 419 |

*Of Celanese polybenzimidazole and the Ultem ® polyetherimides indicated dissolved in N,N-dimethylacetamide, precipitated in methanol, thermally aged at 280° C. for 5 min.
DSC Conditions: 25°/min under nitrogen

EXAMPLE 2

Blends were prepared by mixing 25% solids PBI dope containing 2% LiCl in N,N,-dimethylacetamide and 25% solids Ultem ® solution in N,N-dimethylacetamide at ratios of 75:25, 50:50 and 25:75. All solutions were clear with colors dominated by the brown PBI. Films were cast from these dopes on glass plates using a doctor blade to produce a wet film 0.2 mm thick. The plate with wet film was then placed in a vacuum oven at 90° to 100° C. in order to remove the bulk of the N,N-dimethylacetamide. After 0.5 hr. or so, the plates were removed and after cooling, were immersed in water to strip the films from the plates. Films were then washed in flowing warm water for at least 2 hr. to remove the remainder of the N,N-dimethylacetamide prior to air drying. With the 50:50 blend dope, it was impossible to draw down a film and set it into the oven before the humidity of the room caused a slight haze of precipitation on the surface. The 25% PBI-75% Ultem ® blend also did not look crisp and clear. This observation shows that these compositions should be cast in a dry box in order to obtain clear films.

Figure 4:
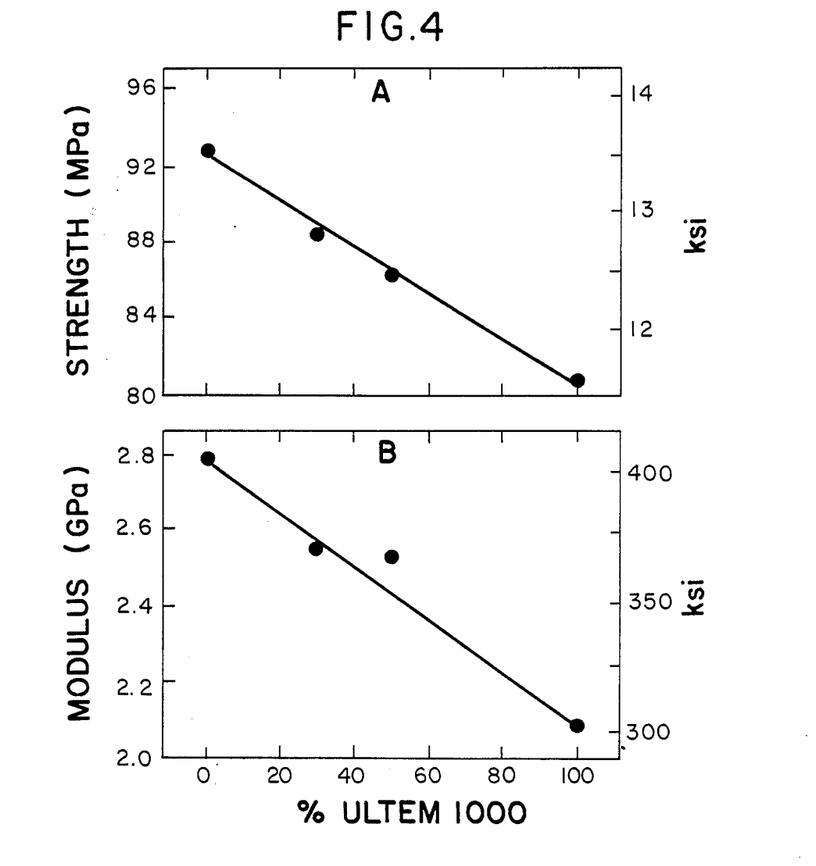
FIG. 4 shows the physical properties of blends of Celanese PBI and Ultem ® 1000 polyetherimide. The Ultem ® 1000 had slightly less strength than the PBI, and the properties of the blends fell in between with a straight line relationship.

Strips of film 6 mm wide were tested in tension to determine their level of physical properties. Since determination of cross sectional area of thin films is difficult, strengths were measured in units of g/denier and were then converted into engineering units by multiplying by (12,800)×(specific gravity). (Mpa=MegaPascal, GPa=GigaPascal, and ksi=thousand pounds/square inch.) The results shown in FIG. 4 were as expected, the Ultem ® was slightly less strong than the PBI, and the properties of the blends fell in between with a straight line relationship. This behavior is strongly indicative of a miscible blend.

EXAMPLE 3

Films comprised of polybenzimidazole and Ultem ® 1000 were cast from N,N-dimethylacetamide solution onto glass. They were dried at 100° C. for six hours in a dry nitrogen atmosphere. They were then washed in very hot water for 16 hours to remove the remaining N,N-dimethylacetamide. The films, ranging in composition from 10 to 40% polybenzimidazole were clear and flexible. Films of 100% polybenzimidazole and 100% Ultem ® were similarly prepared for reference purposes.

Strips of the films, with the compositions listed in Table 6, were immersed in methylene chloride and chloroform. Ultem ® 1000 dissolved rapidly in each solvent, whereas polybenzimidazole was virtually unaffected. Shown in Table 6 are the % weight loss and the % of solvent absorbed for the films during the immersion time given. Each set of data represents an individual fresh film sample—not multiple immersions. In methylene chloride, substantially reduced amounts of the film were extracted by the solvent as the polybenzimidazole content increased from 20 to 30%. Equilibrium weight loss was achieved after about 18 hours for 20% polybenzimidazole and in less than 3 hours for 30% polybenzimidazole. In chloroform, substantially reduced amounts of the film were extracted by the solvent as the polybenzimidazole content increased from 30 to 40%. Thus, addition of the polybenzimidazole greatly enhanced the resistance of Ultem ® 1000 to attack by the chlorinated hydrocarbon solvents tested.

TABLE 6

Solubility Studies of Compositions of Aromatic Polybenzimidazole/Aromatic Polyetherimide (Ultem ® 1000)

| Blend Composition | % Mass Lost/ % Solvent Absorbed | |
|---|---|---|
| % PBI/Ultem ® 1000 | 25 Hrs. | 4 days |
| Methylene Chloride | | |
| 0/100 | 100/- | 100/- |
| 10/90 | 53/16 | 55/31 |
| 20/80 | 26/15 | 28/23 |
| 30/70 | 5/17 | 8/21 |
| 40/60 | 5/20 | 4/21 |
| 100/0 | 0/0 | 0/0 |
| Chloroform | | |
| 0/100 | 100/- | 100/- |
| 10/90 | 63/49 | 69/54 |
| 20/80 | 9/6 | 47/41 |
| 30/70 | 2/5 | 17/23 |
| 40/60 | 1/5 | 2/20 |
| 100/0 | 1/0 | 2/0 |

| Blend Composition | % Mass Lost in Methylene Chloride | | | | |
|---|---|---|---|---|---|
| % PBI/Ultem ® 1000 | 3 Hrs | 6 Hrs | 12 Hrs | 13 Hrs | 25 Hrs |
| 20/80 | 13 | 19 | 22 | 25 | 26 |
| 30/70 | 4 | 3 | 4 | 4 | 5 |

Figure 5:
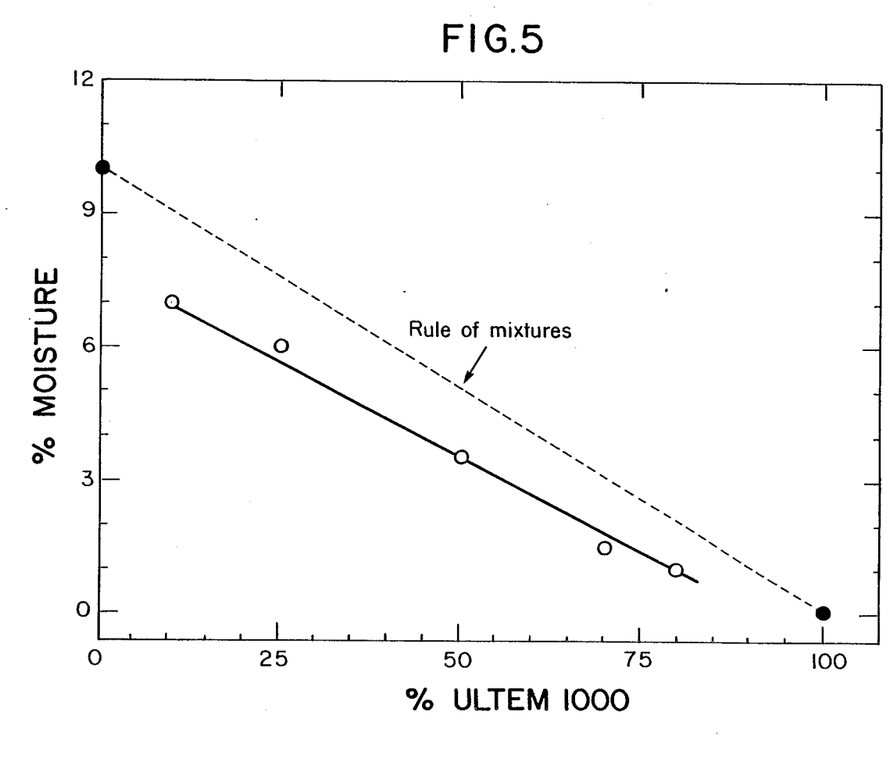
FIG. 5 records the moisture weight loss data determined for films with the compositions shown in the Figure compared to films of 100% Celanese polybenzimidazole and 100% Ultem ® 1000 polyetherimide, respectively. Strips of polybenzimidazole Ultem ® 1000 miscible films were immersed in water at 70° C. for 16 to 18 hours. After this immersion period, the surface water was removed by drying the films with paper toweling. The water weight loss was determined by thermal gravimetric analysis in the 50° to 200° C. temperature range with a heating rate of 10° C./min under nitrogen. It is apparent that the blended films had a lower moisture regain than that predicted by a rule of mixture linear interpolation.

Strips of polybenzimidazole-Ultem ® 1000 miscible films were also immersed in water at 70° C. for 16 to 18 hours. After this immersion period, the surface water was removed by drying the films with paper toweling. The water weight loss was determined by thermal gravimetric analysis in the 50° to 200° C. temperature range with a heating rate of 10° C./min under nitrogen. Recorded in FIG. 5 are the moisture weight loss data determined for films with the compositions shown in the figure, compared to films comprised of 100% polybenzimidazole and Ultem ® 1000. It is apparent that the blended films had a lower moisture regain than that predicted by a rule of mixture linear interpolation. In particular, the addition of only 10% Ultem ® to polybenzimidazole reduced its moisture regain from 10 to 7%.

What is claimed is:

1. A composition comprising from about 1 part by weight to about 99 parts by weight of an aromatic polyetherimide and from about 99 parts by weight to about 1 part by weight of an aromatic polybenzimidazole.

2. A composition as claimed in claim 1 in which the aromatic polyetherimide contains units of the formula:

wherein >Ar¹— and >Ar³— represent trivalent aromatic moieties or mixtures thereof; wherein Y represents divalent aromatic moieties —Ar²—, or divalent aliphatic moieties R¹ containing up to 6 carbon atoms, or mixtures thereof; wherein Z represents aromatic moieties —Ar⁴—, or divalent aliphatic moieties R² containing up to 6 carbon atoms, or mixtures thereof, and wherein x has a value of 0 or is a positive integer; and the aromatic polybenzimidazole contains units of the formula:

wherein >Ar⁵< represents a tetravalent aromatic moiety having the formula or by weight of an aromatic polyetherimide and from about 35 parts by weight to about 5 parts by weight of an aromatic polybenzimidazole.

9. A composition as claimed in claim 1 which comprises at least about 25 to 30 parts by weight of an aromatic polybenzimidazole.

10. A composition as claimed in claim 1 in which the aromatic polybenzimidazole is poly-2,2'-(m-phenylene)-5,5'-bibenzimidazole.

11. A composition as claimed in claim 1 in which the aromatic polyetherimide contains units of the formula:

wherein $R^3$ is —O—, —SO$_2$—, or $\text{-(CH}_2\text{)}_x$ and x is a positive integer; and —Ar$^6$— represents a divalent aromatic moiety having the formula

,

, or wherein $R^4$ is —O—, $\text{-(CH}_2\text{)}_x$, or —Si(CH$_3$)$_2$—O—Si(CH$_3$)$_2$— and x is a positive integer.

3. A composition as claimed in claim 1 which comprises from about 5 parts by weight to about 95 parts by weight of an aromatic polyetherimide and from about 95 parts by weight to about 5 parts by weight of an aromatic polybenzimidazole.

4. A composition as claimed in claim 1 in which the composition is mostly comprised of an aromatic polybenzimidazole and the aromatic polyetherimide is present in the composition in an amount sufficient to make the aromatic polybenzimidazole more tractable and processable and also less susceptible to moisture.

5. A composition as claimed in claim 1 which comprises from about 65 parts by weight to about 95 parts by weight of an aromatic polybenzimidazole and from about 35 parts by weight to about 5 parts by weight of an aromatic polyetherimide.

6. A composition as claimed in claim 1 which comprises at least about 10 parts by weight of an aromatic polyetherimide.

7. A composition as claimed in claim 1 in which the composition is mostly comprised of an aromatic polyetherimide and the aromatic polybenzimidazole is present in the composition in an amount sufficient to make the aromatic polyetherimide less sensitive to solvents and also to increase the glass transition temperature of the polyetherimide.

8. A composition as claimed in claim 1 which comprises from about 65 parts by weight to about 95 parts 12. A composition as claimed in claim 1 which is phase separated.

13. A composition as claimed in claim 1 which is phase separated and comprises from about 5 parts by weight to about 95 parts by weight of an aromatic polyetherimide and from about 95 parts by weight to about 5 parts by weight of an aromatic polybenzimidazole.

14. A composition as claimed in claim 1 which is phase separated and comprises at least about 25 to 30 parts by weight of an aromatic polybenzimidazole.

15. A composition as claimed in claim 1 which is phase separated and comprises at least about 10 parts by weight of an aromatic polyetherimide.

16. A film prepared from miscible compositions of claim 1.

17. A film as claimed in claim 16, in which the aromatic polyetherimide contains units of the formula:

wherein >Ar$^1$— and >Ar$^3$— represent trivalent aromatic moieties or mixtures thereof; wherein Y represents divalent aromatic moieties —Ar$^2$—, or divalent aliphatic moieties R$^1$ containing up to 6 carbon atoms, or mixtures thereof; wherein Z represents aromatic moieties —Ar$^4$—, or divalent aliphatic moieties R$^2$ containing up to 6 carbon atoms, or mixtures thereof; and wherein x has a value of 0 or is a positive integer; and the aromatic polybenzimidazole contains units of the formula:

wherein >Ar$^5$< represents a tetravalent aromatic moiety having the formula or wherein R³ is —O—, —SO₂—, or –(CH2)–x and x is a positive integer; and —Ar⁶— represents a divalent aromatic moiety having the formula or wherein $R^4$ is —O—, —CH2—x, or —Si(CH₃)₂—O—Si(CH₃)₂— and x is a positive integer.

18. A film as claimed in claim 16 in which the proportions are from about 5 parts by weight to about 95 parts by weight of an aromatic polyetherimide and from about 95 parts by weight to about 5 parts by weight of an aromatic polybenzimidazole.

19. A film as claimed in claim 16 in which there is present at least about 25 to 30 parts by weight of an aromatic polybenzimidazole.

20. A film as claimed in claim 16 in which there is present at least about 10 parts by weight of an aromatic polyetherimide.

21. A film as claimed in claim 16, in which the aromatic polyetherimide contains units having the formula:

22. A film as claimed in claim 16 in which the aromatic polybenzimidazole is poly-2,2'-(m-phenylene)-5,5'-bibenzimidazole.

* * * * *